United States Patent [19]
Gross

[11] Patent Number: 5,609,121
[45] Date of Patent: Mar. 11, 1997

[54] DEVICE FOR MARKING A VEHICLE

[75] Inventor: Leon S. Gross, Philadelphia, Pa.

[73] Assignee: Enterprises, Inc., Philadelphia, Pa.

[21] Appl. No.: 303,457

[22] Filed: Sep. 9, 1994

[51] Int. Cl.[6] ............................ B60Q 9/00; G09F 7/20
[52] U.S. Cl. ........................ 116/28 R; 40/591; 40/594; 40/600; 116/209
[58] Field of Search .................... 116/28 R, 173, 116/209; 40/591, 592, 597, 600, 611, 660

[56] References Cited

U.S. PATENT DOCUMENTS

| | | | |
|---|---|---|---|
| D. 165,495 | 12/1951 | Thibault | D14/6 |
| D. 173,202 | 10/1954 | Hollins | D48/32 |
| D. 322,413 | 12/1991 | Castillo | D10/110 |
| D. 326,643 | 5/1992 | McNulty | D11/165 |
| D. 330,730 | 11/1992 | Watanabe | D20/10 |
| D. 343,370 | 1/1994 | Gross | D10/110 |
| 1,621,810 | 3/1927 | Rice | 40/660 |
| 1,708,459 | 4/1929 | Wood . | |
| 3,136,289 | 6/1964 | Johnson | 40/591 X |
| 3,540,406 | 11/1970 | Dexter | 116/28 R |
| 3,791,337 | 12/1974 | Schamblin | 116/28 R |
| 3,812,815 | 5/1974 | Kuenzel | 116/28 R |
| 3,889,384 | 6/1975 | White | 116/38 R X |
| 3,933,117 | 1/1976 | Maietta | 116/28 R |
| 4,054,302 | 10/1977 | Campbell | 116/28 R X |
| 4,080,924 | 3/1978 | Leclaire | 116/28 R |
| 4,633,215 | 12/1986 | Anders et al. | 116/28 R X |
| 4,876,981 | 10/1989 | Barnhart | 116/173 |
| 4,881,485 | 11/1989 | Feinberg | 116/28 R |
| 4,964,360 | 10/1990 | Henry | 116/28 R |
| 5,430,974 | 7/1995 | Hering | 40/660 X |

*Primary Examiner*—William A. Cuchlinski, Jr.
*Assistant Examiner*—Willie Morris Worth
*Attorney, Agent, or Firm*—Dann, Dorfman, Herrell and Skillman, P.C.

[57] ABSTRACT

A device for marking a vehicle is provided having a base for attaching the device to the vehicle. A cantilevered support rod is pivotally connected with the base to permit pivotal movement and positioning of the rod relative to the base. A hollow marking sleeve having an outer transparent tube and an inner fluorescent liner disposed within the tube slidably mounts onto the support rod for marking the vehicle. The sleeve engages the support rod with sufficient contact force to retain the sleeve in position on the support rod. The sleeve is slidably removable from the support rod so that the sleeve may be pulled from the support rod.

23 Claims, 3 Drawing Sheets

FIG. 1
FIG. 2
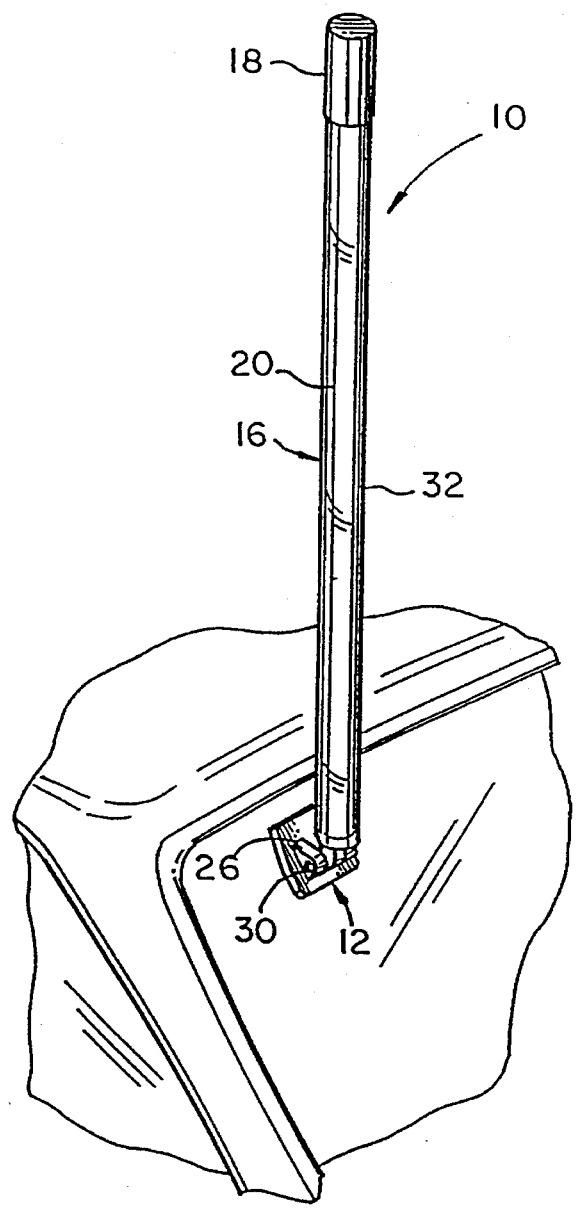
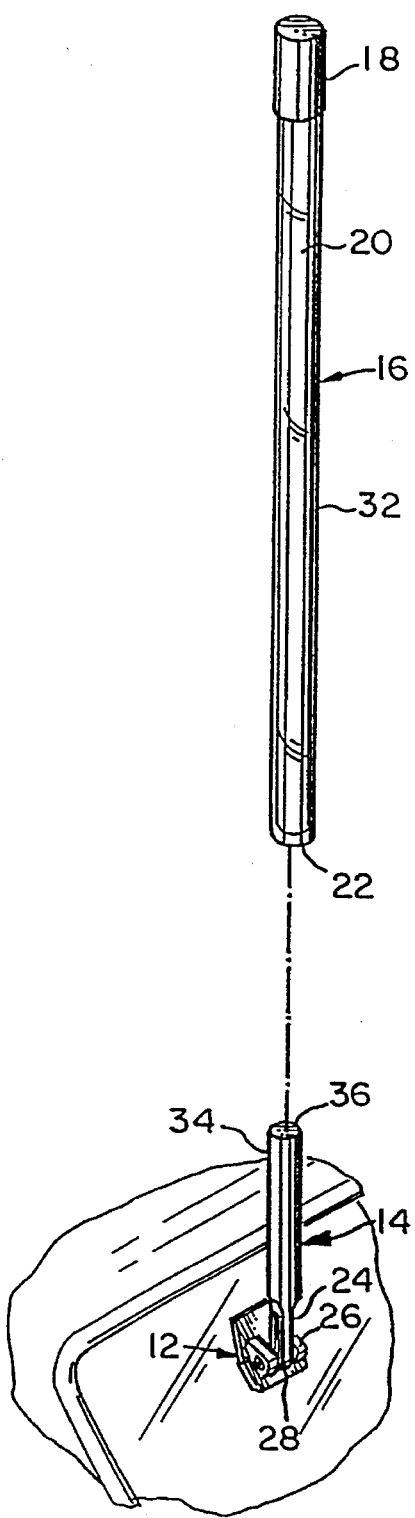

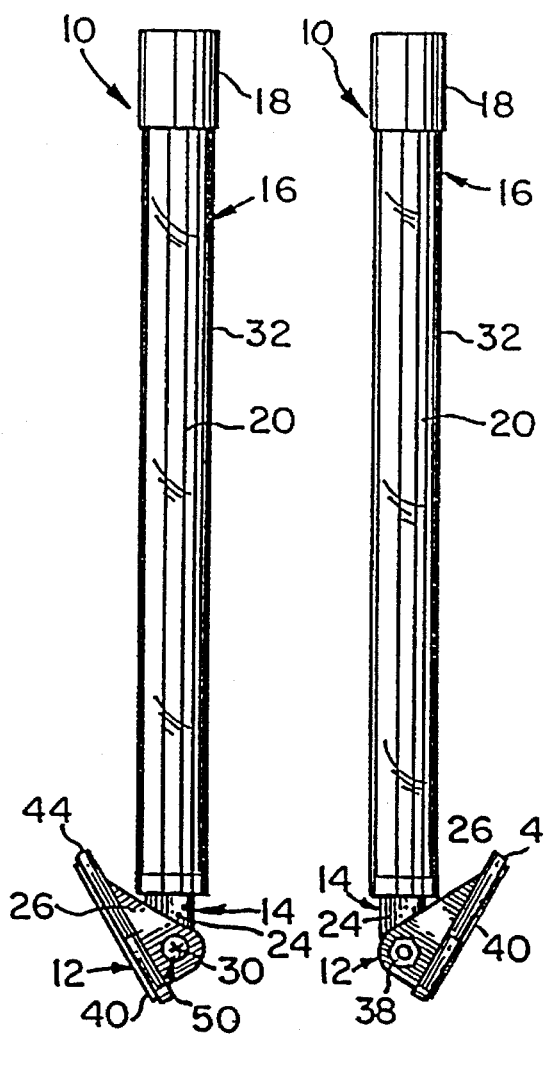
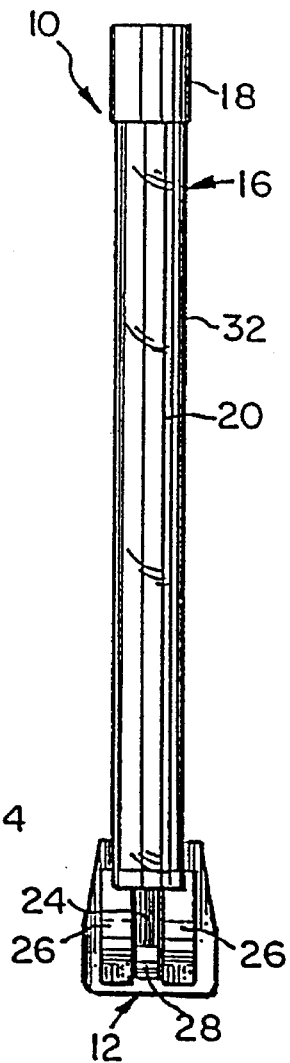
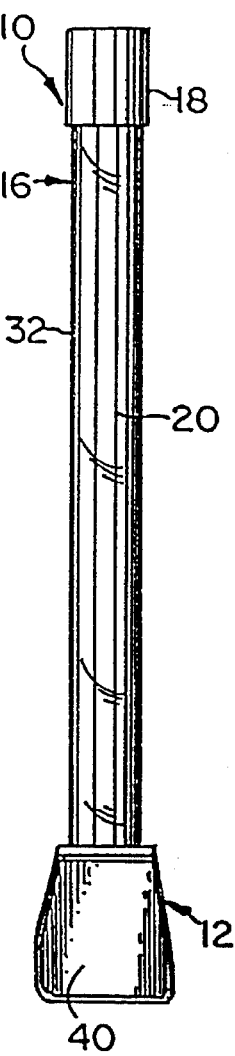
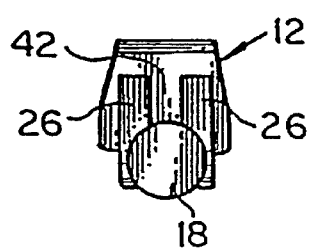
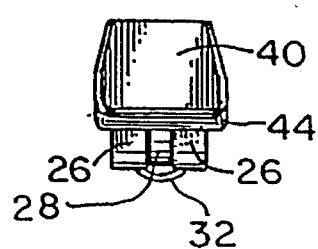

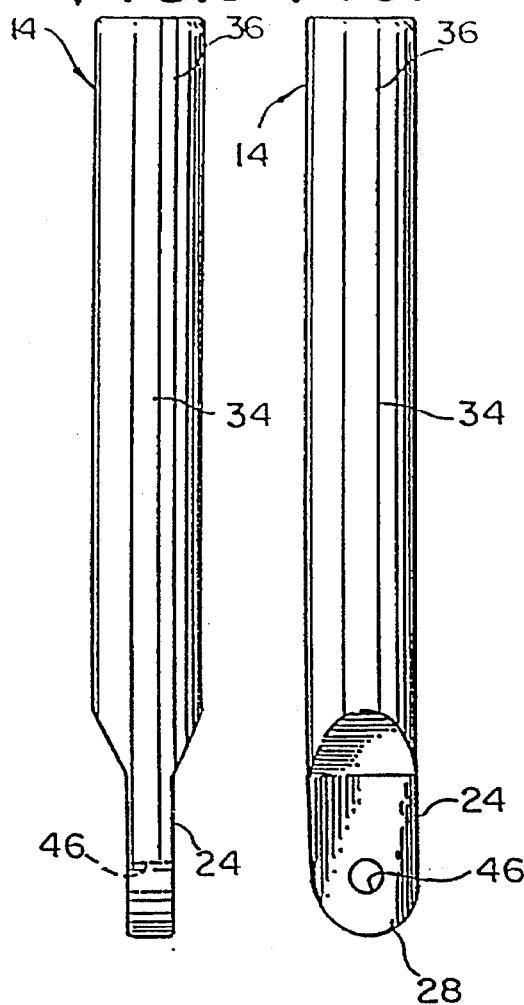
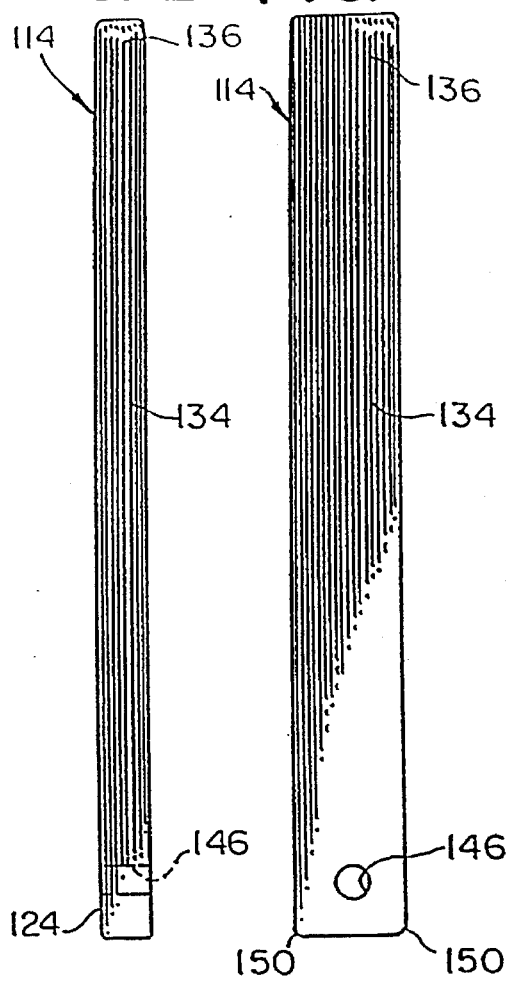
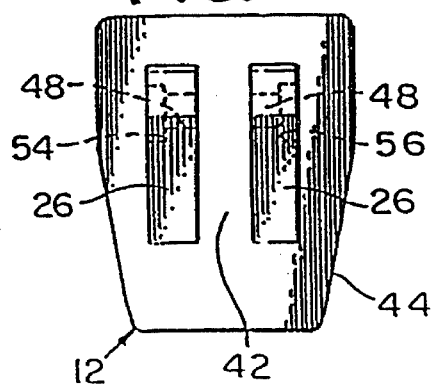
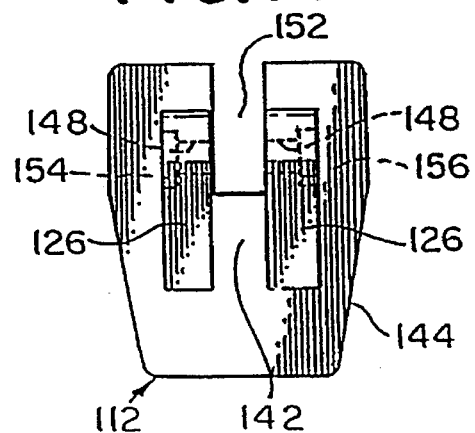

DEVICE FOR MARKING A VEHICLE

FIELD OF THE INVENTION

The present invention generally relates to a device for marking a vehicle and, more specifically, to a vehicle marking device that mounts to and projects from a vehicle in a conspicuous position to assist a user in locating the vehicle in a crowded parking area.

BACKGROUND OF THE INVENTION

Various types of devices have been used over the years to mark vehicles. Typically, vehicle markers are attached to radio antennae or in other conspicuous locations on a vehicle to provide enhanced visibility of the vehicle in crowded parking areas.

One of the problems frequently encountered in utilizing conventional marking devices has been the difficulty of securing such devices to a vehicle to prevent inadvertent detachment while at the same time enabling the devices to be conveniently reoriented or removed if necessary. In many instances, tools may be required to affix or remove the devices. While not an overwhelming problem, the need for tools becomes most inconvenient if the marking device must be removed at remote locations. For example, the need for tools becomes a particular nuisance if the vehicle marker must be temporarily removed at a location such as an automatic car wash.

In other instances, suction cup mounting has been employed to eliminate the need for tools. However, the use of suction cups is not always satisfactory because suction cups require a suitable mounting surface—one that is dry, clean and relatively flat, to permit secure attachment. The tendency of suction cups to prematurely release due to temperature or pressure changes is also a problem. As a result, the marking device might be damaged or lost in the event that a user neglects to remove the device prior to driving the vehicle.

Other conventional devices suffer from the drawback that, once mounted, such devices cannot be easily repositioned into less conspicuous orientations. In accordance with the present invention, a marking device is provided that is capable of being moved into a conspicuous orientation to mark a vehicle and capable of being conveniently repositioned or partially disassembled if the need arises.

SUMMARY OF THE INVENTION

In accordance with the present invention, a device for marking a vehicle is provided. The marking device includes a base for mounting the device to the vehicle. The base has a mounting section that generally conforms to the mounting surface of the vehicle and is secured to the vehicle using a mounting attachment such as a two-sided adhesive or a magnet attached to the base. In addition, the base includes a rod support in the form of two opposing support ribs projecting from the base to form an intermediate groove.

A cantilevered support rod having a mounting end and a free end is mounted on the base. The mounting end of the rod is pivotally connected to the rod support of the base on a pin that passes through a hole in the mounting end of the rod. The pin traverses the groove and is supported at opposite ends by the opposing support ribs. The pin allows pivotal movement of the rod relative to the base. An end portion of the mounting end of the rod is disposed in the groove between the support ribs and moves within the groove during pivotal movement of the rod. The free end of the rod projects from the base to provide a cantilevered support arm. The rod may be pivotally moved between selected positions relative to the base. The rod remains in position relative to the base after the rod is moved to selected positions.

A marking sleeve is mounted on the support rod to mark the vehicle. For this purpose, the sleeve includes bold markings, such as fluorescent colors, to enhance the visibility of the device. For example, the sleeve may include a transparent outer tube and a fluorescent inner liner to provide a highly visible marker. The sleeve has an opening at one end to permit slidable mounting of the sleeve onto the free end of the rod. The open end of the sleeve has a predetermined inside width that is generally the same as the outside width of the free end of the rod so that cooperating contact between the sleeve and the rod retains the sleeve in position on the rod. The sleeve sufficiently engages the free end of the rod to hold the sleeve in position on the rod.

BRIEF DESCRIPTION OF THE DRAWINGS

The foregoing summary, as well as the following detailed description of the preferred embodiments of the present invention, will be better understood when read in conjunction with the appended drawings, in which:

FIG. 1 is a perspective view of the marking device mounted to a back window of a vehicle in accordance with the present invention;

FIG. 2 is an exploded perspective view of the marking device shown in FIG. 1;

FIGS. 3 and 4 are side elevational views of the marking device;

FIG. 5 is a front elevational view of the marking device;

FIG. 6 is a back elevational view of the marking device;

FIG. 7 is a top plan view of the marking device;

FIG. 8 is a bottom plan view of the marking device;

FIG. 9 is an enlarged front elevational view of a support rod for the marking device in accordance with the present invention;

FIG. 10 is an enlarged side elevational view of the support rod for the marking device;

FIG. 11 is an enlarged top plan view of a base for the marking device;

FIG. 12 is an enlarged front elevational view of a support rod for use with a marking device in accordance with another preferred embodiment of the invention;

FIG. 13 is an enlarged side elevational view of the support rod shown in FIG. 12; and FIG. 14 is an enlarged top plan view of an alternative base of a marking device for use in conjunction with the support rod shown in FIGS. 12 and 13.

DETAILED DESCRIPTION OF THE PREFERRED EMBODIMENT

Referring to FIGS. 1 and 2, a highly-visible marking device, generally designated 10, serving as a vehicle locator is provided for placement on a vehicle for conspicuously marking the vehicle to assist in the location of the vehicle in a crowded parking area. The marking device 10 may also be used to designate a status of a particular vehicle. For example, an attendant at a rental car parking lot might use the marking device to designate those automobiles that are available for rental. In addition, different colors may be employed to delineate other types of vehicle status, such as long term or short term parking.

Generally, the marking device 10 includes a base 12 for attaching the device to the vehicle. A cantilevered support rod 14 is pivotally connected with the base. The support rod 14 may be adjusted by manual displacement to project upwardly from the vehicle to enable prominent marking of the vehicle. Alternatively, the support rod 14 may be moved into a generally downward position extending generally along the surface of the vehicle when marking of the vehicle is not desired. To adjust the position of the support rod 14, the user simply pivots the support rod 14 relative to the base 12 stopping at a desired position. A highly-visible sleeve 16 having a fluorescent color may be slidably mounted on the support rod 14 to enhance visibility of the marker. The sleeve 16 may be of various colors and configurations to differentiate vehicles when multiple users are utilizing the marking device.

The base 12 of the device is formed or molded from plastic and includes a mounting section 44 having a generally flat surface in order to conform to the generally flat surfaces of the vehicle on which the device 10 is to be mounted. For example, the generally flat surface of the mounting section 44 of the base 12 enables the device 10 to be securely mounted on a conforming flat surface of the rear window of a vehicle as shown in FIG. 1. Alternatively, the mounting section 44 of the base 12 may be configured for mounting on irregular surfaces. For example, a slightly concave surface may be desirable when mounting the base 12 to a curved or convex section of the vehicle.

A mounting attachment is provided on the base to permit the device to be securely attached to the vehicle. For this purpose, a two-sided adhesive strip 40 may be attached to the mounting section 44 of the base for securing the base 12 of the device 10 to the vehicle. Alternatively, a magnet attached to the base 12 may be used to facilitate removable mounting of the marking device 10 to the vehicle.

The base 12 of the device 10 includes a rod support section having two spaced-apart support lugs in the form of opposing ramp-shaped ribs 26 projecting from the mounting section of the base forming a longitudinal groove 42 therebetween. The groove 42 provides a pathway extending across the top surface of the base 12.

A pivot pin 50 is held in position by the support ribs 26. The opposing ends of the pivot pin 50 are disposed in aligned holes 48 provided in the opposing support ribs 26 of the base 12 so that the pin 50 traverses the groove 42.

As shown in FIGS. 9 and 10, the support rod 14 may be in the form of a solid plastic cylindrical shaft 34 having a mounting end 24 for connection with the base 12 and a free end 36 for projecting from the base to provide a pivotally movable, cantilevered support arm. The mounting end 24 of the support rod connects to the base 12 by the pivot pin 50 inserted through an aperture 46 in the mounting end 24 of the support rod 14. The support rod 14 rotates about the pin 50.

The mounting end 24 of the cylindrical rod 34 is tapered into a generally flat end portion 28 for interfitting within the groove 42 of the base 12 in friction fit between the support ribs 26. The support ribs 26 serve to guide the pivotal movement of the cantilevered support rod 14 by restricting lateral movement of the mounting end 24 of the support rod within the groove 42. The end portion 28 of the mounting end 24 of the rod is rounded to provide sufficient clearance at the end portion 28 of the rod relative to the base 12 to permit the rod 14 to freely pivot about pin 50 between selected raised and lowered positions. As the rod is pivoted, the rounded end portion 28 of the mounting end swings within the groove 42 between the support ribs 26 without contacting the base.

The pin 50 that connects the rod 14 to the base 12 is in the form of a screw 30 having a generally smooth central section on which the support rod is mounted and external threads on one end and a head on the other end. A corresponding hexagonal nut 38 is provided having internal threads for engaging the external threads of the screw 30. A counter-bore 54 is provided at the outside surface of one of the ribs 26 to countersink the head of the screw 30. A hexagonal recess 56 is provided at the outside surface of the other rib 26 to countersink the hexagonal nut 38. The hexagonal recess 56 prevents the recessed nut 38 from turning during rotation of the screw 50. Alternative pin arrangements, such as rivets, may also be used to connect the support rod 14 to the base 12.

The use of a screw 30 and nut 38 enables the friction fit between the ribs 26 and the interfitting flat end portion 28 of the rod 14 to be adjusted. When assembled, the threads on the screw mate with the threads on the nut. Consequently, when the screw is turned in one direction, the width of the groove 42 contracts and thereby increases the frictional contact force between the flat end portion 28 of the support rod 14 and the ribs 26 of the rod support. Alternatively, rotation of the screw in the opposite direction permits expansion of the groove 42 and thereby decreases the frictional contact force between the ribs 26 and the mounting end of the rod 14. Preferably, the friction fit between the support rod and the ribs of the base is adjusted to be loose enough so that the support rod 14 may be manually moved between desired positions but tight enough so that the support rod will be held in position after manual movement. A sufficient force must be provided to prevent the support rod from freely flopping back and forth.

An alternative rod configuration is shown in FIGS. 12 and 13. As illustrated, the support rod 114 is in the form of a bar 134 having a mounting end 124 and a free end 136. The mounting end 124 has square corners 150 and a through-hole 146. An alternative base 112, as shown in FIG. 14, is also provided. The base 112 includes a mounting section 144, a pair of ribs 126, and an intermediate groove 142 formed between the ribs 126. Through-holes 148 are provided in the ribs to support a screw 30 to permit mounting of the rod 114 to the base 112. In addition, a counter-bore 154 and a hexagonal recess 156 are provided in the ribs 126 to respectively countersink the head of the screw 30 and the nut 38. A clearance slot 152 is provided in the mounting section 144 of the base 112 in alignment with groove 142 to provide sufficient clearance between the square corners 150 of the rod 114 and the base 112 so that the square shoulders 150 pass within the slot 152 during pivotal movement of the rod 114. The clearance slot 152 provides swing room for the square corners of the support bar 134.

In operation, the base 12 and the support rod 14 may be used to mark the vehicle as shown in FIG. 2. To enhance effectiveness as a marking device, the support rod 14 may be formed from a fluorescent-colored plexiglass material, which is highly visible from long distances. To further enhance the effectiveness of the marking device 10, a marking sleeve 16 is provided having a generally hollow plastic outer tube 32 having open ends 22 and an inner cylindrical surface. The outer tube 32 may be made from a transparent plastic so that a colored or highly visible insert 20 disposed within the tube 32 is visible through the tube. The insert 20 may be formed as an inner liner for the tube by rolling a piece of fluorescent-colored paper into a tube with the fluorescent side of the paper facing outward. The rolled paper may then be inserted into the tube 32 through the open end 22. Once inserted, the rolled liner tends to unroll and thereby engages the inner cylindrical surface of the outer tube to hold the liner in position. Any colored or otherwise decorated insert may be used. The use of inserts permits convenient color selection or change. In other embodiments, a colored or decorated outer tube 32 may be used in addition to or instead of the insert.

A plastic end cap 18 is provided over the free end of the outer tube 32. The cap 18 is in friction fit with the tube 32 and functions to seal the free end of the tube 32. The other end of the tube remains open to permit slidable mounting of the tube onto the support rod.

Initially, a user of the marking device mounts the base 12 and rod 14 of the device to a suitable surface of a vehicle, such as a rear window. The device 10 can be used without the hollow sleeve 16, in which case the rod is pivotally adjusted to project upwardly away from the vehicle to mark the vehicle. For more visible marking, the hollow sleeve 16 is slipped onto the support rod 14. The sleeve 16 may either loose or slip fit over the free end of the support rod 14 or, alternatively, friction fit with the support rod. If the sleeve is dimensioned relative to the rod to engage the rod in loose fit or slip fit, the length of the rod must be sufficiently long relative to the length of the sleeve to retain the sleeve on the rod during use. The outside width of the free end of the rod must also be almost the same as the inside width of the open end of the sleeve to provide a small amount of spacing therebetween to enable a slip fit. Alternatively, if the sleeve is dimensioned relative to the rod to engage the rod in friction fit, the outside width of the free end of the rod is dimensioned the same as the inside width of the open end of the sleeve so that the contact force between the sleeve and the rod is sufficient to hold the sleeve on the rod. A loose or slip fit is desirable if the user of the device 10 wishes the sleeve 16 to be readily removable from the support rod simply by slipping the sleeve on and off the rod. In contrast, a friction fit may be desirable when the user of the device 10 desires the sleeve 16 to be retained more firmly on the support rod. Whether used in slip fit or friction fit, fasteners are not required to attach the sleeve to the rod. Consequently, tools are not required to install or remove the sleeve relative to the support rod.

The free end 36 of the rod 14 has an outside shape and width that is generally the same as the inside shape and width of the open end of the sleeve 16 so that cooperating contact between the sleeve 16 and the rod 14, whether in slip fit or friction fit, retains the sleeve 16 in position on the rod 14 without the use of fasteners or connectors. In the embodiment of the invention shown in FIGS. 12–14, the free end 136 of the support rod 114 has an outside width or dimension that is generally the same as the inside diameter or width of the open end of the sleeve 16 so that cooperating contact, between the sleeve 16 and the side edges of the rod 114, again whether in slip fit or friction fit, retains the sleeve 16 in position on the rod 114.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A device for marking a vehicle comprising:
   (a) a base for mounting the device to the vehicle, the base having a mounting section for engaging the vehicle to permit the device to be mounted on the vehicle and a rod support;
   (b) a cantilevered support rod projecting from the base having a free end of predetermined outside width and a mounting end pivotally connected at the rod support of the base to permit the rod to be pivotally moved between selected positions relative to the base, the rod being frictionally held by the rod support relative to the base to enable the rod to remain in position after the rod is moved between positions; and
   (c) a tubular marking sleeve having a transparent tube and an inner liner visible through the tube and an open end to permit slidable mounting and detachable removing of the sleeve onto and off of the cantilevered support rod for marking of the vehicle and a closed end to cover the free end of the support rod when the sleeve is mounted onto the support rod, the open end of the tubular sleeve having an inside width that is generally the same as the outside width of the free end of the rod so that cooperating contact between the sleeve and the rod retains the sleeve in position on the rod.

2. The device according to claim 1 wherein the free end of the rod is of a sufficient width relative to the width of the open end of the sleeve so that the sleeve engages the rod in slip fit and wherein the rod is of sufficient length relative to the length of the sleeve to retain the sleeve on the rod.

3. The device according to claim 1 wherein the free end of the rod is of a sufficient width relative to the width of the open end of the sleeve so that the sleeve engages the rod in friction fit to retain the sleeve on the rod.

4. The device according to claim 1 wherein the liner includes a fluorescent color.

5. The device according to claim 1 wherein the rod support includes a pathway and wherein the mounting end of the rod is disposed within the pathway to permit the pivotal movement of the rod.

6. The device according to claim 5 wherein the device includes a pin traversing the pathway of the rod support and wherein the mounting end of the rod is mounted on the pin for rotational movement of the rod about the pin.

7. The device according to claim 6 wherein the mounting end of the rod is in friction fit with the rod support of the base for maintaining the rod in position upon rotational movement of the rod.

8. The device according to claim 7, comprising adjustment means for adjusting the friction fit between the rod support of the base and the mounting end of the rod.

9. The device according to claim 5 wherein the mounting end of the rod is generally flat and includes a rounded end portion to permit pivotal movement of the mounting end within the pathway.

10. The device according to claim 5 wherein the base includes a clearance slot in alignment with the pathway and wherein the mounting end of the rod is flat and includes an end portion disposed within the clearance slot to provide swing room for the end portion of the mounting end of the rod through the clearance slot during pivotal movement of the rod.

11. A device for marking a vehicle comprising;
   (a) a base for mounting the device to the vehicle, the base having a mounting section for engaging the vehicle to permit the device to be mounted on the vehicle and a rod support;

(b) a cantilevered support rod projecting from the base having a free end of predetermined outside width and a mounting end pivotally connected at the rod support of the base to permit the rod to be pivotally moved between selected positions relative to the base, the rod being frictionally held by the rod support of the base to enable the rod to remain in position after the rod is moved between positions; and (c) a tubular marking sleeve having a transparent tube and a colored insert disposed within the tube, an open end to permit slidable mounting and detachable removing of the sleeve onto and off of the cantilevered support rod for marking of the vehicle and a closed end to cover the free end of the support rod when the sleeve is mounted onto the support rod, the open end of the tubular sleeve having an inside width that is generally the same as the outside width of the free end of the rod so that cooperating contact between the sleeve and the rod retains the sleeve in position on the rod.

12. The device according to claim 11 wherein the transparent tube includes a free end and wherein the device comprises a removable cap mounted on the free end of the tube to enclose the tube.

13. The device according to claim 1 comprising an adhesive mounting attachment on the mounting section of the base to permit mounting of the device to the vehicle.

14. A device for marking a vehicle comprising:

(a) a base for mounting the device to the vehicle, the base having a mounting attachment for attaching the device to the vehicle and a rod support having a pair of support ribs forming a groove therebetween;

(b) a pin supported by the support ribs traversing the groove;

(c) a cantilevered support rod having a free end extending away from the base and a mounting end disposed within the groove of the base, the mounting end of the rod being mounted on the pin for pivotal movement of the rod and being held in friction fit between the support ribs of the base to retain the rod in position after pivotal movement of the rod; and (d) a marking sleeve having an opening at one end to permit slidable mounting of the sleeve onto the rod for marking of the vehicle, the sleeve including a transparent tube and a colored liner disposed within the tube and the sleeve being slidably detachable from the support rod.

15. The device according to claim 14 wherein the mounting end of the rod includes an end portion having generally square corners and wherein the base includes a clearance slot aligned with the groove of the base and wherein the end portion of the rod moves within the slot to permit pivotal movement of the rod.

16. A device for marking a vehicle comprising:

(a) a base for mounting the device to the vehicle;

(b) a support rod on the base; and (c) a tubular sleeve having an outer transparent tube and an inner colored liner disposed along an inner surface of and visible through the tube, the tubular sleeve being removably mountable over the support rod for marking the vehicle, the sleeve engaging the support rod with sufficient contact force to hold sleeve in position on the support rod and the tubular sleeve being detachably removable from the support rod and having a closed end to enable the sleeve to cover the support rod when the sleeve is mounted on the support rod.

17. A device for marking a vehicle comprising:

(a) a base for mounting the device to the vehicle, the base having a mounting section for engaging the vehicle to permit the device to be mounted on the vehicle and a rod support having a pair of support ribs projecting from the base to provide a groove therebetween;

(b) a pivot pin traversing the groove supported by the support ribs;

(c) a cantilevered support rod projecting from the base having a free end of predetermined outside width and a mounting end disposed within the groove and pivotally connected with the pivot pin at the rod support of the base to permit the rod to be pivotally moved between selected positions relative to the base, the rod being frictionally held by the support ribs to enable the rod to remain in position relative to the base after the rod is moved between positions; and (d) a tubular marking sleeve having a transparent tube and an inner colored liner visible through said tube, the tubular marking sleeve having an open end to permit slidable mounting of the sleeve onto the cantilevered support rod in slip fit for marking of the vehicle and a closed end to cover the free end of the support rod when the sleeve is mounted on the rod, the open end of the tubular sleeve having an inside width that is generally the same as the outside width of the free end of the rod so that the cooperating contact between the sleeve and the rod retains the sleeve in position on the rod.

18. The device according to claim 17 wherein the mounting end of the rod is in friction fit between the support ribs of the base for maintaining the rod in position upon rotational movement of the rod and wherein the device includes adjustment means for adjusting the friction fit between the support ribs of the base and the mounting end of the rod.

19. The device according to claim 17 wherein the base includes a clearance slot in alignment with the groove and wherein the mounting end of the rod is flat and includes an end portion disposed within the clearance slot to provide swing room for the end portion of the mounting end of the rod within the clearance slot during pivotal movement of the rod.

20. A device for marking a vehicle comprising:

(a) a base for mounting the device to the vehicle, the base having a mounting section for engaging the vehicle to permit the device to be mounted on the vehicle and a rod support having a pair of support ribs projecting from the base to provide a groove therebetween;

(b) a pivot pin traversing the groove supported by the support ribs;

(c) a cantilevered support rod projecting from the base having a free end of predetermined outside width and a mounting end disposed within the groove and pivotally connected with the pivot pin at the rod support of the base to permit the rod to be pivotally moved between selected positions relative to the base, the rod being frictionally held by the support ribs to enable the rod to remain in position relative to the base after the rod is moved between positions; and (d) a tubular marking sleeve having a transparent tube and a colored insert disposed within the tube and visible through said tube, the tubular marking sleeve having an open end to permit slidable mounting of the sleeve onto the cantilevered support rod in slip fit for marking of the vehicle and a closed end to cover the free end of the support rod when the sleeve is mounted on the rod, the open end of the tubular sleeve having an inside width that is generally the same as the outside width of the free end of the rod so that the cooperating contact between the sleeve and the rod retains the sleeve in position on the rod.

21. The device according to claim 16 wherein the inner colored liner is removable from the tube.

22. The device according to claim 5 wherein the base includes a clearance slot in alignment with the pathway and wherein the rod is a rectangular bar and includes a mounting end portion disposed within the clearance slot to provide swing room for an end portion of the mounting end portion of the rod through the clearance slot during pivotal movement of the rod.

23. The device according to claim 17 wherein the base includes a clearance slot in alignment with the groove and wherein the rod is a rectangular bar and includes a mounting end portion disposed within the clearance slot to provide swing room for an end portion of the mounting end portion of the rod through the clearance slot during pivotal movement of the rod.

* * * * *